United States Patent Office 3,441,514
Patented Apr. 29, 1969

3,441,514
ACTIVATION OF AN ISOMERIZATION CATALYST WITH AN INITIAL SULFUR CHLORIDE TREATMENT AND SUBSEQUENTLY WITH AN OXYGEN-CONTAINING GAS
Joseph P. Giannetti, Allison Park, Howard G. McIlvried III, Pittsburgh, and Raynor T. Sebulsky, Verona, Pa., assignors to Gulf Research & Development Company, Pittsburgh, Pa., a corporation of Delaware
No Drawing. Filed Oct. 24, 1966, Ser. No. 588,744
Int. Cl. B01j 11/16, 11/74
U.S. Cl. 252—441
12 Claims

ABSTRACT OF THE DISCLOSURE

Highly active low temperature isomerization catalysts are produced by contacting a composite catalyst comprising a major portion of alumina and containing a minor portion of a metalliferous material having hydrogenating activity with a sulfur chloride and then with an oxygen-containing gas under non-reducing conditions at a temperature in the range of between about 750° F. and about 1100° F. Alternatively, a highly active catalyst may be produced by contacting the composite material with a gaseous halogen and an oxygen-containing gas at a temperature in the range between about 750° F. and about 1100° F. prior to contacting the composite material with a sulfur chloride.

This invention relates to the preparation of novel low temperature isomerization catalyst compositions and to the use thereof for the isomerization of relatively unbranched hydrocarbons to more highly branched forms.

In copending application Ser. No. 358,628, filed in the United States Patent Office on Apr. 9, 1964, in the name of William C. Starnes, there is disclosed and claimed a method of activating composite catalytic materials comprising alumina and a metalliferous hydrogenating component by treatment with a sulfur chloride. In another copending application, Ser. No. 388,678, filed in the United States Patent Office on Aug. 10, 1964, a method is disclosed and claimed wherein catalysts of the above type are treated with hydrogen chloride to improve their susceptibility to activation with the sulfur chlorides.

It has now been found that the activity of such catalysts can be enhanced to a high degree by activating the catalysts with a sulfur chloride selected from the group consisting of sulfur monochloride, thionyl chloride, sulfuryl chloride and sulfur dichloride, and an oxygen-containing gas at a temperature within the range of between about 750° and about 1100° F. Surprisingly, it has been discovered that oxygen will coact with each of the foregoing sulfur chlorides to enhance the activation thereof to an unexpectedly high degree only if the temperature employed is within this critical range. If temperatures below this range are employed, the resulting catalyst will not possess the desired high level of activity.

According to another aspect of the invention, the activity of the sulfur chloride activated catalysts can likewise be enhanced to be an unexpectedly high degree by pretreating the catalyst with a gaseous mixture comprising a halogen and oxygen at a temperature in the range of between about 750° and about 1100° F., prior to the sulfur activation treatment.

According to another aspect of this invention, the activity of the sulfur chloride activated catalysts can be still further enhanced by the incorporation of a hydrogen chloride pretreatment and a hydrogen chloride post treatment.

In accordance with the present invention, a composite catalytic material comprising a major proportion of alumina and containing a minor proportion of a metalliferous material having hydrogenating activity, such as platinum metal, is activated for the isomerization of hydrocarbons by contacting the catalytic material with a sulfur chloride selected from the group consisting of sulfur monochloride, thionyl chloride, sulfuryl chloride and sulfur dichloride, and an oxygen-containing gas under non-reducing conditions at a temperature in the range of between about 750° and about 1100° F., preferably between about 800° and about 1050° F. Temperatures below this critical range will not yield a catalyst possessing the desired activity, while temperatures above this range can physically damage the catalyst.

The sulfur chloride-oxygen activation may be conducted by initially contacting the catalyst with the sulfur chloride and oxygen at a temperature somewhat below 750° F., e.g. in the range of about 200° to about 700° F., followed by a subsequent treatment with oxygen, alone, in the critical range of about 750° to about 1100° F. Alternatively, the sulfur chloride-oxygen activation may be conducted with the sulfur chloride and oxygen employed concurrently with a temperature in the critical range of from about 750° to about 1100° F. in a single treatment. Regardless of the particular mode of contact employed, it is essential that the oxygen contact the catalyst at a temperature in the critical range.

The sulfur chloride may be contacted with the catalyst base in any proportions, while under the foregoing conditions, which are sufficient to substantially increase the chlorine content of the catalyst base. Proportions sufficient to increase the chlorine content of the catalyst base by about 1 percent under the reaction conditions employed will produce an appreciable improvement in the activity of the catalyst, but it is preferred to utilize larger proportions sufficient to increase the chlorine content of the catalyst by at least about 3 and preferably up to about 7 percent by weight. However, still larger proportions can be used; for example, there can be used amounts sufficient to yield up to 12 percent chlorine in the catalyst base without undue difficulties. Within the limits indicated, the use of the sulfur chloride in weight ratios of about 0.02 to 20.0, and preferably about 0.1 to 1.0 with respect to the catalyst base, is effective at the conditions disclosed herein to achieve the desired results. For example, suitable weight ratios of sulfur monochloride to catalyst include from about 0.15:1 to about 0.4:1.

The pressure employed in the sulfur chloride activation process of this invention may be varied over a broad range, but is preferably atmospheric. However, elevated pressures may be suitably employed with equally good results. The time of contact may also be varied over a wide range. Contact times in the range of from about 0.5 to about 24 hours, and preferably from about 1 to about 10 hours are effective to increase the chlorine content of the catalyst base to a satisfactory level for the purposes of this invention. Some benefit in catalyst activity is obtainable, even if the activation treatment is prematurely interrupted.

The employment of an oxygen-containing gas is essential to the present invention, as it enhances the sulfur chloride activation to the desired extent when employed at the aforesaid temperatures. The term "oxygen containing gas" is intended to include, but is not limited to oxygen and mixtures of oxygen with inert gases, such as air (which is essentially a 20 percent oxygen, 80 percent nitrogen gas mixture). In general, mixtures of oxygen with any other gas or gases, which do not adversely affect the sulfur chloride-activated catalysts are suitable.

While it is not intended to limit this invention to any particular theory, it appears that a primary function of the oxygen-containing gas in the sulfur chloride-oxygen activation is to react with and remove in the form of a sulfur oxide any sulfur which might result from interaction of the sulfur chloride with the catalyst. For example, in the case of catalyst activation with sulfur monochloride, the following general reaction appears to take place:

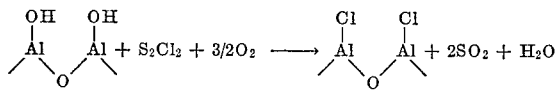

Thus, it is essential to employ at least a stoichiometric amount of oxygen with respect to the sulfur, so that the sulfur can be preferentially removed from the surface of the catalyst by means of combustion. By way of example, if 22 grams of sulfur monochloride is employed, at least about 8 grams of oxygen is required to completely remove the sulfur as sulfur dioxide. It is preferred to use an excess of oxygen over that stoichiometrically required to insure a high degree of sulfur removal.

Catalysts activated with the sulfur chloride as indicated may not be completely free of sulfur, but chlorine is present in a disproportionate amount with respect to sulfur. Thus, whereas a typical sulfur content of a catalyst prepared in accordance with this invention might be about 0.01 percent by weight, the corresponding chlorine content of such catalyst might be as much as about 3 to 12 percent. While it is presumed that the chlorine interacts chemically in some not fully understood way with the catalyst base, available evidence indicates that the nature of the reaction is unique, as catalysts prepared in the manner disclosed herein have been found markedly superior to comparable catalysts in which the chlorine content of the catalyst is increased, for example, by treatment with vaporous aluminum chloride.

As previously mentioned, another aspect of this invention involves the pretreatment of sulfur chloride activated catalysts with a gaseous mixture comprising a halogen and oxygen at a temperature between about 750° and 1100° F., preferably between about 950° and about 1050° F. The pretreatment is conducted prior to any other activation of the composite catalytic material, including the treatment of the catalyst with the sulfur chloride. The employment of a high temperature halogen-oxygen activation step prior to the sulfur chloride activation step results in a catalyst having an activity equal to or greater than that produced by the high temperature sulfur chloride-oxygen activation treatment of this invention. When a halogen-oxygen pretreatment is employed, the sulfur chloride activation may be conducted at temperatures below the 750° to 1100° F. range and in the absence of an oxygen-containing gas.

As in the case with the chlorine-sulfur chloride activation, the pressures employed in the halogen-oxygen pretreatment may be varied over a wide range with atmospheric pressure being preferred. Elevated pressures may be suitably employed if desired. Likewise, the time of contact may be varied over a broad range. Suitable contact times include from a few minutes to several hours, with some benefit being derived even if the treatment is prematurely interrupted. The halogen-oxygen pretreatment may suitably be conducted until there is a breakthrough of halogen in the effluent gas from the catalyst bed.

The amount of halogen employed may suitably be within the range of from about 0.1 to about 10 percent and preferably between about 1 to about 3 percent by weight of the catalyst.

Any of the gaseous halogens may be suitably employed in the pretreatment, i.e. chlorine, fluorine and bromine, however, chlorine is preferred. The halogen and the oxygen employed in the pretreatment need not be pure and may contain various inert gases, such as nitrogen, which do not adversely affect the catalyst.

While it is necessary that the amount of oxygen employed in the sulfur chloride-oxygen activation be at least sufficient to remove most of the sulfur, i.e., stoichiometric amounts, the oxygen concentration employed in the halogen-oxygen pretreatment may be varied over a wide range. Thus, the oxygen content of ordinary air is entirely adequate for the purposes of this invention. A few percent halogen in the air that forms the source of the oxygen is preferred for the pretreatment.

As previously indicated, the sulfur chloride treatment of the catalyst base is carred out under non-reducing conditions effective to promote a substantial increase in the chlorine content of the catalyst base. As pointed out above, the chlorine content of the treated catalyst that is attributable to sulfur chloride treatment appears to be related to the activity of the catalyst for purposes of this invention.

When an oxygen-containing gas is concurrently employed with the sulfur chloride, non-reducing conditions will prevail. However, when the oxygen-containing gas is not employed concurrently with the sulfur chloride activation, an inert carrier gas, such as nitrogen may be utilized to insure the existence of non-reducing conditions during the sulfur chloride treatment of the catalyst base. Alternatively, non-reducing conditions may be achieved by excluding materials other than the catalyst base and the sulfur chloride from the reaction zone.

By "non-reducing conditions" is meant merely essentially non-reducing conditions. Accordingly, conditions under which a small proportion of a reducing component such as hydrogen is present are not intended to be excluded.

As previously mentioned, composite catalytic materials that have been activated in the manner indicated above may be still further benefited by the employment of a hydrogen chloride pretreatment and a hydrogen chloride post treatment. This additional treatment produces composite catalytic materials that are highly effective as catalysts for the low temperature isomerization of paraffinic hydrocarbons. The hydrogen chloride pretreatment may be suitably conducted prior to the sulfur chloride-oxygen activation, but subsequent to the halogen-oxygen activation, when the latter is employed.

The hydrogen chloride employed in the pretreating step can be used in any proportion with respect to the composite catalytic material that is effective to increase the chlorine content of such material, as even a small increase in the chlorine content of such material obtained in this fashion will effectively increase the isomerization catalytic activity obtainable by the subsequent treatment with the sulfur chloride. It is preferred to employ hydrogen chloride in substantial excess of the amount that is capable of combining with the composite catalytic material at the reaction conditions employed. Excellent results are obtainable by the use of hydrogen chloride in proportions of about 0.1 to 1:1 by weight with respect to the catalyst, but larger or smaller proportions can also be used with good results.

The action of the hydrogen chloride upon the composite catalytic material takes place easily at atmospheric pressures, and elevated pressures are not necessary, although such pressures may be used if desired. The hydrogen chloride pretreatment described above, can be carried out for as little as a few minutes, since some hydrogen chloride can combine with the catalyst even when only a small amount of water is removed from the composite catalytic material, but it is preferred to continue the hydrogen-hydrogen chloride treatment until no further evolution of water can be observed and until no further combination of hydrogen chloride with the catalyst is obtained at the reaction conditions selected. Normally with a HCl rate of 0.33 mole HCl/hr.100 g. of platinum-alumina this point will have been reached before about 3 hours at the temperatures indicated, and no further advantage is obtained by longer periods of hydrogen chloride treatment, although the pretreatment has been successfully carried out for as long as 6 hours. The water that is removed during the pretreatment can be physically adsorbed water, chemically or pseudochemically bound water such as water of hydration, or water formed by the reaction of hydroxyl groups present on the surface of the alumina.

The hydrogen chloride utilized in the pretreatment operation need not be pure and may contain other materials that do not adversely affect the isomerization activity of the finished catalyst. In fact, it may be convenient to employ a diluent gas, such as hydrogen, in a ratio of about 1:1 to 10:1 by volume with the hydrogen chloride. Inert diluent gases, such as nitrogen, can also be used in the same or other proportions. Moreover, the hydrogen chloride need not be employed as such but can be introduced in the form of a hydrogen chloride precursor, such as propyl chloride, t-butyl chloride or other chlorine-substituted aliphatic hydrocarbon, when hydrogen is used as the diluent gas.

The hydrogen chloride pretreatment of the composite catalytic material may be carried out under any conditions effective to remove at least a portion of the water not previously removed during calcining and drying of the composite catalytic material (which steps will be subsequently discussed), and that will not adversely affect the catalytic activity of the catalyst by sintering. Temperatures in the range of from about 950° to about 1250° F., and preferably from about 1000° to about 1100° F., are normally effective for this purpose. Temperatures significantly less than about 950° F. should not be used for purposes of the present invention, since such lower temperatures are relatively less effective to enhance the susceptibility of the catalyst base to activation with the sulfur chloride.

The hydrogen chloride aftertreatment can be carried out at any conditions that will not significantly reduce the chlorine content of the previously activated catalyst. Temperatures in the range of about 60° to 900° F., preferably in the range of about 325° to 800° F., can be used. While some effect of the hydrogen chloride aftertreatment may be noted at temperatures below 60° F., the temperature of the hydrogen chloride aftertreatment should not be significantly above about 900° F.

It is preferred to employ the hydrogen chloride in excess of the amount that will combine with the activated catalyst at the conditions of treatment, but smaller amounts may be used. By way if illustration, excellent results are obtainable by the use of hydrogen chloride in proportions of about 0.1 to 1:1 by weight with respect to the activated catalyst.

Similarly as in the case of the hydrogen chloride pretreatment, the hydrogen chloride aftertreatment may be carried out at atmospheric pressure, and elevated pressures are not necessary, although such pressures can be used. Also, as in the case of the hydrogen chloride pretreatment, the contact with hydrogen chloride may be effected over a period of a few minutes to several hours with good results. If desired, the hydrogen chloride aftertreatment may be carried out before or during contact of the catalyst with a hydrocarbon feed to be isomerized. No significant additional advantages are observed from carrying out the hydrogen chloride aftertreatment beyond 3 hours, although longer treating periods can be used successfully.

Likewise, the hydrogen chloride utilized in aftertreatment need not be pure and may contain as a diluent hydrogen gas or inert diluent gases such as nitrogen and the like, in any proportion. By way of illustration, good results are obtainable when hydrogen is employed in proportions of from about 1:1 to about 10:1 by volume with respect to the hydrogen chloride.

The composite catalysts from which the activated catalysts of this invention are derived may comprise any form of porous alumina suitable for use as a catalytic agent or support. For example, excellent results are obtainable with aluminas prepared by calcining a beta-alumina trihydrate such as bayerite or mixtures thereof with other alumina hydrates. Aluminas prepared by calcining other hydrated aluminas, such as the amorphous alumina formed by hydrolysis of aluminum methoxide, or crystallized alumina hydrates, such as alpha-alumina trihydrate or gibbsite, or naturally occurring materials containing same, such as bauxite, "new" beta-alumina trihydrate or nordstrandite, and alpha- and beta-alumina monohydrate such as boehmite and diaspore, or various combinations of any of these may also be used. Additionally, there may be used the aluminas described in copending patent applications Ser. Nos. 118,240, 118,241 and 118,279, filed June 20, 1961, in the names of William L. Kehl and Meredith M. Stewart, which aluminas are prepared by calcining an alumina hydrate containing 1.2 to 2.6 mols of water of hydration per mol of alumina. The alumina bases useful in the present invention may be essentially pure alumina as is preferred, or they can contain small amounts, up to about 45 percent of other refractory oxides, such as silica, beryllia, titania, zirconia or boria. Such aluminas are generally characterized by a high surface area, commonly ranging from about 200 to about 500 m.$^2$/g., or even more.

Especially advantageous results are obtainable when using aluminas having a surface area above about 250 m.$^2$/g., and more particularly, above about 300 m.$^2$/g., although aluminas of lower surface area may be used. Presumably, the amount of chlorine that can be taken up during the sulfur chloride treatment is a function of the surface area that can be contacted thereby, although available experimental evidence indicates that the amount of chlorine taken up is not necessarily limited by surface area.

The catalyst bases or precursors from which the activated catalysts of this invention are prepared are composited with a small proportion of at least one metalliferous component, having hydrogenating activity and selected from the left-hand column of Group VI or from Group VIII of Mendelyeev's Periodic Table. Examples of suitable materials are platinum, rhodium, palladium, nickel and tungsten. Especially good results are obtainable with platinum and palladium. In general, the hydrogenating component will be present in amounts in the range of from about 0.01 to about 5.0 percent by weight of the catalyst, and preferably from about 0.1 to about 2.5 percent, particularly in the case of noble metal components. By way of example, excellent results are obtainable with 0.2 and 0.7 percent platinum or 1 percent palladium on alumina.

The hydrogenating component can be composited with the alumina in any convenient way. Thus, the hydrogenating component can be deposited on a precalcined alumina support in the form of a water solution of a water-soluble salt, following which the wetter base can be calcined. Examples of such solutions are solutions containing chloroplatinic acid or other halogen platinum acids, or water solutions of nickel and tungsten nitrate in the desired proportion with respect to one another. Alternatively, the hydrogenating component can be added as a salt to the alumina hydrate and then precipitated with a substance such as hydrogen sulfide and calcining, or calcining alone. Additionally, an aqueous metal sulfide sol, for example, a platinum sulfide sol, can be used to impregnate an alumina hydrate or admixed with an alumina solution prior to drying and calcining.

Regardless of the method of compositing the starting catalyst base, the noble metal hydrogenating components are advantageously converted to a reduced form prior to the pretreatment with hydrogen chloride or the activation treatment with sulfur chloride. In the case of base metals such as nickel and tungsten, the hydrogenating component can remain in the form of a sulfide or oxide prior to the hydrogen chloride pretreatment and the sulfur chloride activation treatment.

It is also important that the hydrogenating component be composited with the alumina base before the hydrogen chloride pretreatment or the sulfur chloride activation treatment, as deposition thereafter normally will result in a reduction of the chlorine content of the sulfur chloride treated base. This is undesirable, as the activity of the herein-disclosed catalyst appears to be generally related to the increase in chlorine content attributable to the sulfur chloride activation treatment.

The catalyst base may contain halogen other than that incorporated by the sulfur chloride treatment. For example, some halogen content may result from the use of an aluminum halide as a starting material to form the alumina base or alternatively, some halogen may remain in the catalyst owing to the use of a halogen-noble metal acid. However, the halogen content from such sources as these is not equivalent to the halogen content resulting from the hydrogen chloride-containing and sulfur chloride treatments for the purposes of this invention.

Catalysts that have been activated by the activating processes described herein are useful in the low temperature isomerization of isomerizable saturated hydrocarbons, including not only straight-chain and slightly branched paraffins such as n-butane, n-pentane and n-hexane, but also cycloparaffins such as cyclohexane and its alkyl-substituted derivatives along with the alkyl-substituted cyclopentanes. These compounds need not be pure but can be mixed with other hydrocarbon materials as in the case of fractions obtained by fractional distillation of gasoline and naphtha cuts obtained from crude oils or reforming, for example. The process is especially advantageous for isomerization of straight-chain paraffin hydrocarbons containing 4 to 6 carbon atoms.

When the isomerization feed stock is derived from crude oil, the sulfur content may be so high as detrimentally to affect the catalyst. In such instances, it may be desirable to desulfurize the feed prior to isomerization in conventional manner, preferably by treatment with a suitable desulfurizing catalyst in the presence of hydrogen at elevated temperature and pressure. Desulfurization is especially important when the hydrogenating metal component of the herein-disclosed catalysts is sensitive to sulfur, as in the case of platinum.

Isomerization of the herein-disclosed feed stocks with the herein-disclosed catalysts is carried out at low temperatures in the range of from about 150° to about 450° F. in the presence of hydrogen gas at a pressure of atmospheric to 2000 p.s.i.g., preferably from about 50 to about 1200 p.s.i.g., using a hydrogen:hydrocarbon mol ratio in the range of from about 0 to about 10:1, preferably from about 0.1 to about 5:1. Space velocities of from about 0.3 to about 10 and preferably from about 0.5 to about 5 volumes of liquid feed per hour per volume of catalyst can be used in continuous processes. The hydrogen is effective to saturate unsaturated bonds and to suppress cracking. The desired hydrogen:hydrocarbon ratio and hydrogen pressure are advantageously maintained in a continuous process by recycling gases separated from the isomerized hydrocarbon product.

This invention may be best understood by reference to the following specific examples, which are illustrative only and are not intended to be limiting as to scope. All of the percentages indicated are by weight, unless otherwise specified.

EXAMPLE 1

A commercial naphtha reforming catalyst in the amount of about 126 grams containing 0.6 percent platinum on an alumina base, having a chlorine content of 0.6 percent chlorine and a surface area of about 425 square meters per gram is calcined at a temperature of 550° F. overnight and at 900° F. for two hours. This catalyst is reduced in a stream of hydrogen at 900° F. for two hours. The hydrogen flow rate utilized is 1.5 standard cubic feet per hour. The reduced catalyst is purged over a period of six hours in a flow of prepurified nitrogen.

The temperature of the catalyst is then raised to 1050° F. in nitrogen and a hydrogen-hydrogen chloride mixture comprising 1.5 standard cubic feet of hydrogen per hour and 15 grams of hydrogen chloride per hour is passed over the catalyst in a period of three hours. The temperature is then reduced to 560° F. with nitrogen and 59 grams of sulfur monochloride ($S_2Cl_2$) is passed over the catalyst for a period of three hours while using a flow of 0.6 standard cubic feet of air per hour. At the conclusion of the sulfur monochloride addition, the catalyst is held at a temperature of 560° F. for a period of one and one-half hours while continuing the air flow. The temperature is then raised to 800° F. over a period of one and one-half hours and held at 800° F. for one-half hour while maintaining the air flow at the rate of 0.6 cubic feet per hour.

The temperature is then reduced to 400° F. and 15 grams per hour of hydrogen chloride is passed over the catalyst for a period of three hours. The catalyst is then cooled.

To test the activity of this catalyst, a continuous run is conducted employing a normal butane feed stock. The butane is passed over the catalyst at a temperature of 325° F. and a pressure of 800 p.s.i.g. while employing a liquid hourly space velocity of 1 and a hydrogen to butane mole ratio of 2.5 to 1.

The normal butane feed stock is converted to isobutane in an amount of 51 percent by weight of the normal butane fed to the reactor.

EXAMPLE 2

A reduced platinum on alumina catalyst of the type described above is activated in the identical manner of Example 1 except that after the air flow at 560° F., which is subsequent to the sulfur monochloride addition, the temperature is raised to 1050° F. over a period of one and one-half hours and is held at this temperature for one-half hour while maintaining the air flow of 0.6 standard cubic feet per hour. The temperature is then reduced to 400° F. and hydrogen chloride is passed over the catalyst in a manner identical to that of Example 1, following which the catalyst is cooled.

Employing the identical conversion conditions of Example 1, a normal butane feed stock is converted to isobutane in an amount of 51 percent by weight of the normal butane fed to the reactor.

The following example illustrates the high degree of activity that may be obtained by activating the catalyst with a chlorine-oxygen mixture prior to the sulfur chloride activation.

EXAMPLE 3

A reduced platinum on alumina catalyst similar to that prepared in Example 1 is raised to a temperature of 950° F. in a stream of nitrogen gas. The catalyst is then treated with dried air at a flow rate of 1 standard cubic foot per hour for a period of one-half hour at a temperature of 950° F. Concurrently, chlorine is added along with the air at a rate of about 1.5 grams of chlorine per hour over a period of two hours. The temperature of the catalyst is then raised to 1050° F. and a mixture of hydrogen and hydrogen chloride is passed over the catalyst in a manner identical to that of the previous examples.

The temperature is then reduced to 560° F. in nitrogen and 59 grams of sulfur monochloride is passed over the catalyst in three hours using a flow of air at the rate of 0.6 standard cubic feet per hour. At the completion of the sulfur monochloride addition, the catalyst is held at a temperature of 560° F. for a period of one and one-half hours while maintaining the air flow. The temperature is then raised to 800° F. over a period of one and one-half hours and is held at 800° F. for one-half hour while maintaining the air flow at the same 0.6 standard cubic feet per hour rate.

The temperature is then reduced to 400° F. and the catalyst is treated with hydrogen chloride in a manner identical to the previous examples, following which the catalyst is cooled.

This catalyst is tested for activity and a butane conversion of 50 percent by weight of the normal butane to isobutane is achieved employing the conversion conditions of the previous examples.

The following example illustrates that a catalyst having a high degree of activity cannot be produced by sulfur monochloride activation in the absence of oxygen.

EXAMPLE 4

One hundred seventy milliliters of the reduced platinum on alumina catalyst of the previous examples is brought to a temperature of 1050° F. and is treated with a mixture of hydrogen and hydrogen chloride as before.

The temperature is then reduced to 560° F. and 59 grams of sulfur monochloride is added to the catalyst over a period of three hours. During the sulfur monochloride addition, a flow of 0.6 standard cubic feet per hour of nitrogen is employed. The temperature is maintained at 560° F. for one and one-half hours after completion of the monochloride addition.

The temperature is then raised to 800° F. over a period of one and one-half hours and is held at this temperature for one-half hour while maintaining the nitrogen flow. The temperature is then lowered to 400° F. and hydrogen chloride is passed over the catalyst as in the prior examples.

Normal butane is passed over this catalyst at a temperature of 325° F. and at a pressure of 800 p.s.i.g., while at a liquid hourly space velocity of 1. A hydrogen to butane mole ratio of 2.5 to 1 is used. The normal butane feed stock is converted to isobutane in an amount of 43 percent by weight of the normal butane feed indicating that the high level of activity achieved in the previous examples is not possible in the absence of oxygen.

The following example indicates that a highly active catalyst cannot be produced even if oxygen is employed with the sulfur monochloride if a temperature below the critical range is used.

EXAMPLE 5

A reduced platinum on alumina catalyst is brought to a temperature of 1050° F. and pretreated with a mixture of hydrogen and hydrogen chloride as before. The temperature of the catalyst is reduced to 560° F. in nitrogen and 59 grams of sulfur monochloride is passed over the catalyst for a period of three hours while maintaining an air flow of 0.6 standard cubic feet per hour. At the completion of the sulfur monochloride addition, the air flow is maintained for a period of three and one-half hours at 560° F. The temperature is then reduced to 400° F. and the catalyst is treated with hydrogen-chloride in a manner identical to that of the previous examples, and is cooled in nitrogen to room temperature.

When this catalyst is tested for its activity for converting normal butane to isobutane under conditions identical to those previously used, a conversion of only 42 percent by weight of the normal butane to isobutane is achieved. This indicates that a temperature of 560° F. is inadequate for the production of a highly active catalyst.

The following example illustrates that temperatures above that of the previous example but still below that of the critical range are insufficient for the production of the highly active catalyst of this invention.

EXAMPLE 6

A reduced platinum on alumina catalyst similar to that of the previous examples is pretreated with a mixture of hydrogen and hydrogen chloride as before. The temperature is reduced to 560° F. and the catalyst is contacted with 21 grams of sulfur monochloride over a period of three hours with an air flow of 0.6 standard cubic feet per hour. At the conclusion of the sulfur monochloride addition, the temperature is maintained at 560° F. for one-half hour with a continued air flow.

The temperature of the catalyst is then raised to 700° F. over a period of one and one-half hours and is held at this temperature for one-half hour while continuing the air flow. The temperature of the catalyst is then reduced to 400° F. in nitrogen and the catalyst is treated with hydrogen chloride and cooled as before.

This catalyst is tested for activity, and a butane conversion of only 43 percent by weight of normal butane to isobutane results when employing the conditions of the previous examples. Accordingly, a temperature of 700° F. is insufficient for the production of the highly active catalyst of this invention.

The following examples illustrate the necessity for concurrent employment of both high temperature and oxygen.

EXAMPLE 7

A reduced platinum on alumina catalyst is pretreated with hydrogen and hydrogen chloride as before. The temperature is reduced to 560° F. and 42 grams of sulfur monochloride are added to the catalyst over a period of five hours. During the addition, a flow of 15 grams of oxygen per hour and 0.3 standard cubic feet of nitrogen per hour are employed. The oxygen and nitrogen are mixed prior to entering the reactor.

At the completion of the sulfur monochloride addition, the oxygen is turned off and a 0.6 standard cubic foot per hour nitrogen flow is passed over the catalyst for a period of two hours at 560° F. The temperature is reduced to 400° F. and the catalyst is treated with hydrogen-chloride and cooled as before.

When tested for activity this catalyst converts normal butane to isobutane in an amount of only 44 percent by weight of the normal butane under the conversion conditions of the previous examples.

EXAMPLE 8

A reduced platinum on alumina catalyst is treated in a manner identical to that of Example 7 except that at the completion of the sulfur monochloride addition the oxygen is tured off and a nitrogen flow rate of 0.6 standard cubic feet per hour is maintained for one hour at a temperature of 560° F. The temperature is then raised to 850° F. over a period of one and one-half hours and is held at this temperature for a period of one hour with the nitrogen flow. No oxygen is employed at this relatively high temperature of 850° F. The temperature is then lowered to 400° F. and the catalyst is treated with hydrogen chloride and cooled as before.

This catalyst is tested for activity under the conversion conditions of the previous examples and converts only 44 percent of the butane to isobutane.

Thus, Examples 4 and 8 show that high temperature in the absence of oxygen at the high temperature does not produce a highly active catalyst, and Examples 5, 6 and 7 show that oxygen in the absence of a high temperature in the critical region of between about 750° and about 1100° F. does not produce a highly active catalyst. Therefore, a comparison of the above examples clearly illustrates that the highly active catalyst of this invention cannot be produced by sulfur monochloride activation, unless both a high temperature and oxygen are concurrently employed as shown by Examples 1, 2 and 3.

The following examples illustrate the employment of thionyl chloride in the process of this invention.

EXAMPLE 9

A reduced platinum on alumina catalyst is pretreated with hydrogen and hydrogen chloride as before. The temperature of the catalyst is reduced to 560° F. in a stream of nitrogen and 54 grams of thionyl chloride ($SOCl_2$) is passed over the catalyst for a period of three hours with a flow of 0.6 standard cubic feet of air per hour.

At the end of the thionyl chloride addition, the catalyst is held at a temperature of 560° F. for a period of one and one-half hours while maintaining the oxygen flow. The temperature is then raised to 800° F. over a period of one and one-half hours and is held for one-half hour at 800° F. with the air flow of 0.6 standard cubic feet per hour. The temperature is then reduced to 400° F. and the catalyst is treated with hydrogen chloride and cooled as before.

The catalyst is tested for activity by passing over it a normal butane feed at a temperature of 325° F. and a pressure of 800 p.s.i.g. A liquid hourly space velocity of 1 and a hydrogen to normal butane mole ratio of 2.5 to 1 is employed as in the previous examples.

The normal butane feed stock is converted to isobutane in an amount of 49 percent by weight of the normal butane feed.

The following example illustrates the advantage of employing a chlorine and oxygen pretreatment of a thionyl chloride activated catalyst.

EXAMPLE 10

A reduced platinum on alumina catalyst is brought to a temperature of 950° F. in a stream of nitrogen. Dry air is then passed over the catalyst at a flow rate of one standard cubic foot per hour for one-half hour at a temperature of 950° F. Chlorine is added along with the air at about 1.5 grams of chlorine per hour over a period of two hours. The temperature of the catalyst was then raised to 1050° F. At this temperature a mixture of hydrogen and hydrogen chloride (1.5 standard cubic feet of hydrogen per hour and 15 grams of hydrogen-chloride per hour) is passed over the catalyst for a period of three hours.

The temperature of the catalyst is then reduced to 560° F. in nitrogen and 54 grams of thionyl chloride is passed over the catalyst for a period of three-quarters of an hour. A nitrogen carrier gas having a flow rate of 0.5 standard cubic feet per hour is simultaneously employed. At the end of the thionyl chloride addition, the temperature is maintained at 560° F. for an additional two hours with a nitrogen purge.

The temperature is then reduced to 400° F. and hydrogen chloride in an amount of 15 grams per hour is passed over the catalyst for a period of three hours. The catalyst is then cooled in a nitrogen stream to room temperature.

A normal butane feed stock is passed over this catalyst under the conditions of the previous example and is converted to isobutane in the amount of 51 percent by weight of the normal butane employed.

The following example illustrates the lower activity of a catalyst which is produced by a process which does not employ either the high temperature-oxygen treatment with the thionyl chloride addition or the use of a chlorine-oxygen pretreatment.

EXAMPLE 11

A reduced platinum on alumina catalyst is treated in a manner identical to that of Example 10 except that the chlorine-oxygen pretreatment step is omitted.

When normal butane is passed over this catalyst under the conditions of the previous example, it is converted to isobutane in an amount of only 44 percent by weight of the normal butane.

The following example illustrates the necessity of employing oxygen during a thionyl chloride activation treatment even when high temperatures are employed.

EXAMPLE 12

A reduced platinum on alumina catalyst is treated in a manner identical to that of Example 11 with the exception that the thionyl chloride is added at a temperature of 800° F. instead of 560° F.

When normal butane is passed over this catalyst under the conditions of the previous examples, it is converted to isobutane in an amount of 44 percent by weight of the normal butane. Thus, the activity of this catalyst wherein a high temperature activation using thionyl chloride is employed is identical to the activity of the catalyst produced in Example 11 wherein a low temperature thionyl chloride activation is employed. A comparison of Examples 11 and 12 with Examples 9 and 10 clearly illustrates that oxygen and a high temperature must be employed with thionyl chloride activation in order to produce a catalyst having the desired high degree of activity.

While the foregoing examples illustrate the high degree of activity which may be achieved with sulfur monochloride and thionyl chloride-activated catalyst when employing the oxygen activation process of this invention, activation with sulfuryl chloride and sulfur dichloride will likewise result in a catalyst having a high degree of activity employing the process of this invention.

Obviously many modifications and variations of the invention as hereinabove set forth can be made without departing from the spirit and scope thereof and, therefore, only such limitations should be imposed as are indicated in the appended claims.

We claim:
1. The method of activating a composite catalyst comprising a major portion of alumina and containing a minor proportion of a metalliferous material having hydrogenating activity, comprising contacting said composite material with a sulfur chloride selected from the group consisting of sulfur monochloride, sulfuryl chloride and sulfur dichloride under non-reducing conditions, and subsequently contacting said catalyst with an oxygen-containing gas at a temperature in the range of between about 750° F. and about 1100° F. so as to result in a catalyst having a high degree of activity.

2. The method of claim 1 wherein said catalyst is contacted with the oxygen-containing gas at a temperature in the range of between about 800° F. and 1050° F.

3. The method of claim 1 wherein the sulfur chloride is sulfuryl chloride.

4. The method of claim 1 wherein the sulfur chloride is sulfur monochloride.

5. The method of claim 1 wherein the oxygen-containing gas is employed in at least stoichiometric amounts with respect to the sulfur chloride.

6. The method of claim 1 wherein the composite catalyst is treated to improve its susceptibility to activation with the sulfur chloride by contacting the same with hydrogen chloride at a high temperature prior to sulfur chloride activation and by contacting said catalyst with hydrogen chloride at a relatively lower temperature subsequent to said treatment with the oxygen-containing gas.

7. The method of claim 1 wherein the metalliferous material is platinum.

8. The method of activating a composite catalyst comprising a major proportion of alumina and containing a minor proportion of a metalliferous material having hydrogenating activity, comprising contacting said composite material with a gaseous halogen and an oxygen-containing gas at a temperature in the range between about 750° F. and about 1100° F., and subsequently contacting the said composite material with a sulfur chloride selected from the group consisting of sulfur monochloride, thionyl chloride, sulfuryl chloride and sulfur dichloride.

9. The method of claim 8 wherein the gaseous halogen is chlorine.

10. The method of claim 8 wherein the composite material is contacted with the halogen and the oxygen-containing gas at a temperature in the range of between about 950° F. and about 1050° F.

11. The method of claim 8 wherein the sulfur chloride is sulfur monochloride.

12. The method of claim 8 wherein the oxygen-containing gas is air.

References Cited

UNITED STATES PATENTS

| | | | |
|---|---|---|---|
| 3,182,013 | 5/1965 | Myers | 260—683.68 |
| 3,218,267 | 11/1965 | Goble et al. | 252—439 |
| 3,322,688 | 5/1967 | Starnes | 260—683.68 |
| 3,322,689 | 5/1967 | Giannetti et al. | 252—439 |
| 3,330,779 | 7/1967 | Giannetti et al. | 252—439 |
| 3,338,843 | 8/1967 | Goble et al. | 260—683.68 |

DELBERT E. GANTZ, *Primary Examiner.*

GEORGE J. CRASANAKIS, *Assistant Examiner.*

U.S. Cl. X.R.

208—683.68; 252—439